(12) United States Patent
Fei et al.

(10) Patent No.: US 12,321,435 B2
(45) Date of Patent: Jun. 3, 2025

(54) BIOMETRIC IDENTIFICATION METHOD, SERVER, AND CLIENT

(71) Applicant: CHINA UNIONPAY CO., LTD., Shanghai (CN)

(72) Inventors: Zhijun Fei, Shanghai (CN); Xuetao Qiu, Shanghai (CN); Tao Tang, Shanghai (CN); Wenji Xing, Shanghai (CN); Pengfei Gao, Shanghai (CN); Yanming Yang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/833,737

(22) PCT Filed: Aug. 19, 2022

(86) PCT No.: PCT/CN2022/113675
§ 371 (c)(1),
(2) Date: Jul. 26, 2024

(87) PCT Pub. No.: WO2023/142453
PCT Pub. Date: Aug. 3, 2023

(65) Prior Publication Data
US 2025/0111026 A1    Apr. 3, 2025

(30) Foreign Application Priority Data
Jan. 28, 2022 (CN) .......................... 202210108922.9

(51) Int. Cl.
*G06F 21/00* (2013.01)
*G06F 21/32* (2013.01)
(Continued)

(52) U.S. Cl.
CPC .............. *G06F 21/32* (2013.01); *G06V 10/82* (2022.01); *G06V 40/172* (2022.01); *G06F 2221/2151* (2013.01)

(58) Field of Classification Search
CPC . G06F 21/32; G06F 2221/2151; G06V 10/82; G06V 40/172
See application file for complete search history.

(56) References Cited

U.S. PATENT DOCUMENTS

| | | | |
|---|---|---|---|
| 2019/0156183 A1* | 5/2019 | Durham | G06N 3/047 |
| 2019/0238568 A1* | 8/2019 | Goswami | G06F 21/566 |

(Continued)

FOREIGN PATENT DOCUMENTS

| | | |
|---|---|---|
| CN | 105847003 A | 8/2016 |
| CN | 110427906 A | 11/2019 |

(Continued)

OTHER PUBLICATIONS

International Application No. PCT/CN2022/113675, International Search Report and Written Opinion, mailed Nov. 24, 2022.

(Continued)

*Primary Examiner* — William A Corum, Jr.
(74) *Attorney, Agent, or Firm* — MARSHALL, GERSTEIN & BORUN LLP (57) ABSTRACT

The disclosure pertains to a biometric recognition method, the method comprising: receiving biometric data; performing a random transformation of low-bit data in received biometric data; randomly selecting one or more filtering algorithms to pre-process randomly transformed biometric data; and performing identity verification based on pre-processed biometric data.

11 Claims, 4 Drawing Sheets

(51) Int. Cl.
*G06V 10/82* (2022.01)
*G06V 40/16* (2022.01)

(56) References Cited

U.S. PATENT DOCUMENTS

| | | | | |
|---|---|---|---|---|
| 2019/0325163 | A1* | 10/2019 | Sharad | G06F 21/82 |
| 2020/0151505 | A1* | 5/2020 | Saito | G06F 18/214 |
| 2020/0159924 | A1* | 5/2020 | Tran | G06F 21/566 |
| 2020/0204548 | A1 | 6/2020 | Song et al. | |
| 2021/0034729 | A1* | 2/2021 | Chung | H04L 9/14 |
| 2021/0152549 | A1 | 5/2021 | Wu et al. | |
| 2023/0236799 | A1* | 7/2023 | Waters | G06F 7/584 |
| | | | | 708/252 |
| 2024/0276023 | A1* | 8/2024 | Edpalm | H04N 19/172 |
| 2024/0331106 | A1* | 10/2024 | De Jong | G06T 5/60 |

FOREIGN PATENT DOCUMENTS

| | | |
|---|---|---|
| CN | 111027404 A | 4/2020 |
| CN | 111177748 A | 5/2020 |
| CN | 111461654 A | 7/2020 |
| CN | 111881436 A | 11/2020 |

OTHER PUBLICATIONS

European Patent Application No. 22923257.4, Extended European Search Report, dated Sep. 12, 2024.

Isa et al., A watermarking technique to improve the security level in face recognition systems, Multimed. Tools Appl., 76:23805-23833 (2017).

Vakhshiteh et al., Adversarial attacks against face recognition: a comprehensive study, Arxiv.org, Cornell University Library (Jul. 23, 2020).

Xu et al., Feature Squeezing: Detecting adversarial examples in deep neural networks, Arxiv.org, Cornell University Library (Apr. 4, 2017).

* cited by examiner

BIOMETRIC IDENTIFICATION METHOD, SERVER, AND CLIENT

CROSS-REFERENCE TO RELATED APPLICATIONS

The present application is a U.S. national stage application of International Application No. PCT/CN2022/113675, titled "BIOMETRIC RECOGNITION METHOD, SERVER AND CLIENT", filed on Aug. 19, 2022, and claims priority to Chinese Patent Application CN202210108922.9, titled "BIOMETRIC RECOGNITION METHOD, SERVER AND CLIENT", filed on Jan. 28, 2022, the disclosures of which are incorporated herein by reference in their entirety for all purposes.

TECHNICAL FIELD

The present application pertains to an identity recognition solution.

BACKGROUND

Over recent years, biometric features (e.g., face, fingerprint, etc.), owing to their close correlation with individual identities, have increasingly emerged as a mainstream method of identity verification.

Accordingly, anticipation builds up for the development of an identity verification solution based on biometric features that can effectively prevent the adversarial sample attack technique.

SUMMARY

According to one aspect of the disclosure, a biometric recognition method is provided, the method comprising: Step A: receiving biometric data; Step B: performing a random transformation of low-bit data in received biometric data; Step C: randomly selecting one or more filtering algorithms to pre-process the randomly transformed biometric data; and Step D: performing identity verification based on the pre-processed biometric data.

According to another aspect of the disclosure, a biometric recognition server is provided, the server comprising: a receiving device to receive biometric data; a low-bit random filter to randomly transform low-bit data in received biometric data; a preprocessor to randomly select one or more filtering algorithms to pre-process randomly transformed biometric data; and an identity verification device to perform identity verification based on pre-processed biometric data.

According to another aspect of the disclosure, a client for use in conjunction with the server is provided, the client comprising: a facial data collection device to collect facial image data; and an embedding device to embed a negative adversarial sample in a facial position, wherein the negative adversarial sample is the additive inverse of the adversarial sample, and the adversarial sample is additive noise superimposed on real facial image data, causing a facial recognition model to produce an erroneous recognition result.

According to another aspect of the disclosure, a method for generating an adversarial sample using a biometric recognition server as discussed previously is provided, the method comprising: Step A: constructing an adversarial generative network comprising a generator and a discriminator; Step B: generating noise information with the generator, and adding the noise information to real facial image data to obtain generated facial data; Step C: recognizing the generated facial data with a facial recognition model; Step D: performing a backpropagation training on the generator based on recognition results; Step E: repeating the Steps B to D until the facial recognition model produces an erroneous recognition result; and Step F: determining the noise information corresponding to the erroneous recognition result as an adversarial sample.

According to another aspect of the disclosure, a computer storage medium is provided, the medium comprising instructions, wherein the instructions, when running, implement the method as discussed previously.

According to another aspect of the disclosure, a computer program product is provided, the product comprising a computer program, wherein the computer program, when executed by a processor, implements the method as discussed previously.

Compared to existing biometric recognition solutions, the biometric recognition solution, according to one or more embodiments of the disclosure, performs a random transformation on low-bit data in received biometric data and carries out identity verification based on pre-processed biometric data. The solution significantly disrupts adversarial noise in images, neutralizing adversarial attacks. Consequently, even if attackers were to obtain the parameters of a biometric recognition model, the training process for an adversarial attack model would fail to achieve stable convergence, thereby failing to develop an effective attack model.

BRIEF DESCRIPTION OF THE DRAWINGS

The aforementioned and other objectives and advantages of the disclosure will become more comprehensive and clear through the detailed description below, in conjunction with the appended drawings, in which identical or similar elements are denoted by the same reference signs.

DETAILED DESCRIPTION

The implementation mode of the disclosure is further described in details below, with reference to the drawings and embodiments. The following embodiments are intended to illustrate the disclosure and should not be seen as limitation on the scope of the disclosure.

In the description of the Specification, the terms, such as "an embodiment," "some embodiments", "example", "specific examples" or "some examples", indicate that a particular feature, structure, material, or characteristic described in connection with the embodiment or example is included in at least one embodiment or example of the present disclosure. According to the Specification, the symbolic representation of the aforementioned terms does not necessarily refer to the same embodiment or example. Moreover, the specific features, structures, materials or characteristics described may be combined by suitable means in one or more embodiments examples, the or Furthermore, terms "first", "second" and "third" are devised for descriptive purposes only, which should not be construed as indicating or implying relative importance. Besides, where not mutually exclusive, those skilled in the art may integrate and combine different embodiments or examples described in the Specification, as well as the features of different embodiments or examples.

In the context of the disclosure, the term "client," also referred to as a user end, denotes a device or apparatus that provides local services to customers in correspondence with servers. In one or more embodiments, the client possesses basic functionalities, including the capability to collect the biometric information of users. Such a client can be a smart device belonging to a user, including, but not limited to, a user's mobile phone, laptop and head-mounted devices.

The term "server," also referred to as a remote server or cloud server, denotes a device or apparatus that provides remote services to the client, corresponding to the "client." In one or more embodiments, the server can offer biometric recognition functionalities resistant to adversarial sample attacks (e.g., facial recognition), meaning that the server performs biometric recognition on the biometric data received from the client after undergoing certain preprocessing steps (such as denoising).

Figure 1:
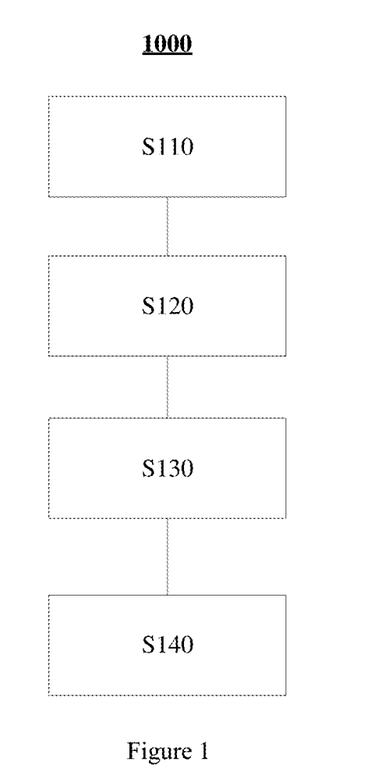
FIG. 1 presents a flowchart of a biometric recognition method according to an embodiment of the disclosure.

FIG. 1 presents a flowchart of a biometric recognition method 1000 according to an embodiment of the disclosure. As illustrated in FIG. 1, the method 1000 comprises the following steps:

At step S110, receiving biometric data;

At step S120, performing a random transformation of low-bit data in received biometric data;

At step S130, randomly selecting one or more filtering algorithms to pre-process randomly transformed biometric data; and At step S140, performing identity verification based on pre-processed biometric data.

In the context of the disclosure, the term "biometric data" refers to any inherent data of a human body that can be used for personal identification, as well as auxiliary information related to the noted data. For example, biometric data includes, but is not limited to, physiological characteristics (such as fingerprints, irises, facial features and DNA) and behavioral characteristics (such as gait and typing habits).

In one embodiment, the biometric data includes facial image data. In another embodiment, in addition to facial image data, the biometric data also includes a timestamp associated with the facial image data. The timestamp could be either the time when the facial image data was recorded or the time when the facial image data was uploaded.

Figure 2:
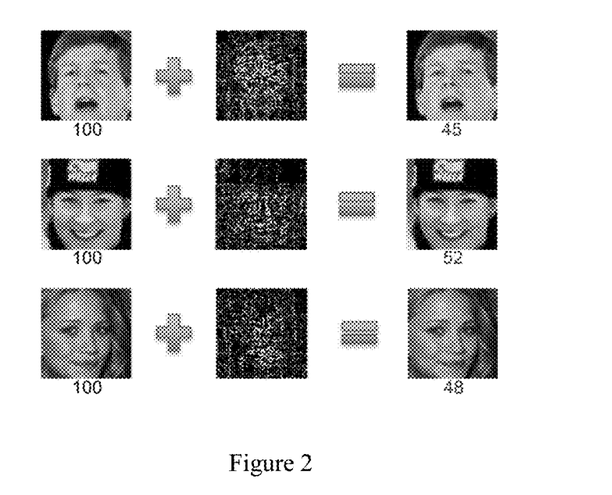
FIG. 2 illustrates the principle of an adversarial sample attack.

Referencing FIG. 2, the figure illustrates the principle of adversarial sample attacks. The "adversarial sample" refers to a sample that can mislead classifiers into making incorrect predictions without affecting human visual recognition, e.g., adversarial samples could be anormal samples created by attackers through slight perturbations of normal samples. In one embodiment, an adversarial sample can cause a CNN model to yield a highly confident incorrect output. FIG. 2 shows an adversarial sample in a facial comparison algorithm. After superimposing adversarial noise, the facial comparison score dramatically drops from 100 to below 60. That is, the facial comparison algorithm can no longer successfully recognize these two individuals in this case.

Adversarial sample attacks can be categorized into white-box attacks and black-box attacks. A white-box attack refers to the scenario where an attacker knows all information about the recognition model, including training data, model architecture, hyper-parameters, the number of layers, activation functions and model weights, and generates adversarial samples for attack through calculation of model gradients, while a black-box attack refers to attacks conducted without knowledge of the aforementioned information.

From the principle of adversarial sample attacks, it is understood that the fundamental cause of misrecognition in a biometric recognition system (e.g., a facial recognition system) is the addition of additive adversarial noise to the biometric data (e.g., facial image data) by attackers.

The inventor of the present application discovers that most of the data values of adversarial noise or adversarial samples are extremely low, for example, only the low bits of 8-bit image data are changed. Thus, performing random transformations on the low-bit data of the biometric data can disrupt most data of adversarial noise. Here, "low-bit data" refers to the lowest bits, the last two bits, or the last three bits of data inherent to the human body that can be used for personal identification.

In one embodiment, step S120 includes performing a random transformation on the lowest bits of the biometric data. Certainly, those skilled in the art can understand that, in one embodiment, a random transformation can also be applied to the last two bits or the last three bits of the biometric data.

In one embodiment, performing a random transformation on the lowest bits of the biometric data includes any one of the following: setting the lowest bits of the biometric data all to 0; setting the lowest bits of the biometric data all to 1; randomly re-arranging the lowest bits of the biometric data; and randomly generating the lowest bits of the biometric data. For example, for 8-bit image data, the random transformation of the lowest bits can include the following four algorithms: (1) setting the 8-bit lowest bits all to 0; (2) setting the 8-bit lowest bits all to 1; (3) randomly re-arranging the 8-bit lowest bits; and (4) randomly generating the 8-bit lowest bits. In one or more embodiments, the algorithm for the random transformation of the lowest bits is not fixed but is randomly selected from multiple algorithms (e.g., the said four algorithms) to pre-process an input image.

After performing a random transformation on the lowest bits of the biometric data, it is advantageous to filter (pre-process) the randomly transformed biometric data again, thereby smoothing the biometric data (e.g., smoothing facial image data). For example, by randomly selecting one or more filtering algorithms, the randomly transformed biometric data is preprocessed.

Taking image data (e.g., facial image data) as an example, there are various image denoising/filtering algorithms, including, including but not limited to, BM3D denoising; DCT denoising; PCA denoising; K-SVD denoising; non-local means denoising; WNNM denoising; image denoising algorithms based on principal component analysis and bilateral filtering; wavelet transformation; wavelet threshold denoising; Contourlet transform; SAR image denoising based on shift-invariant Contourlet transform, etc. In one or more embodiments, one or several of these 11 filtering algorithms are randomly selected to pre-process an input image. Normally, removing noise does not affect the recognition results of a facial recognition system, which instead significantly disrupts the adversarial noise in the image, rendering the adversarial attack ineffective.

In one embodiment, in step S140, the identity verification is performed based on pre-processed biometric data to obtain a first comparison result. Although not shown in FIG.

1, the aforementioned method 1000 may also comprise: repeating the aforementioned steps S120 to S140 to obtain a second comparison result (wherein, the filtering algorithm employed in re-executing steps S120 and S130 is different or partially different from that used in the first execution); and directly performing identity verification based on received biometric data to obtain a third comparison result.

In the aforementioned embodiment, the method 1000 also comprises: comparing the first, second, and third comparison results for consistency; and feeding back the first comparison result when the first comparison result, the second comparison result and the third comparison result are consistent. However, on condition that there is inconsistency among the first comparison result, the second comparison result and the third comparison result, a recognition process anomaly is fed back; and a corresponding data collection terminal is added to a blacklist.

Evidently, the third recognition is an identity verification carried out directed at the original biometric data (i.e., without undergoing the random transformation of lower bits), while the first and the second recognitions are both of identity verifications performed on biometric data undergone random transformation of lower bits (where different filtering algorithms may be employed). On condition that the results of these three identity verifications are consistent, the identity verification result can be directly fed back. However, when the results of multiple identity verifications (e.g., three times) differ, a recognition process anomaly (likely due to an adversarial sample attack) may be fed back, with the terminal where the anomalous data are collected being added to a blacklist. Subsequently, identity verification services would be denied to the terminal.

Thus, through the addition of a multi-image verification strategy and a blacklist rejection strategy, it is capable of effectively preventing attackers from conducting black-box mode attack training.

At present, the most significant issue affecting facial recognition is camera hijacking attacks, which severely damage the security of facial recognition systems. The primary principle of such attacks is as follows: firstly, an attacker "cracks" a payment app to hijack camera data; next, the attacker completes the live detection process required for facial recognition; finally, the attacker replaces video data uploaded by a camera with pre-fabricated victim video data and uploads falsified data to a backend facial recognition system, thereby completing the entire attack process. Currently, the vast majority of facial recognition systems lack the capability to defend against such camera hijacking attacks.

To address the issue, in one embodiment, between Steps S110 and S120, the method 1000 may further comprise: decrypting the biometric data to obtain the facial image data and the timestamp; feeding back an anomaly when the difference between the system time and the timestamp does not meet the requirements; when the difference between the system time and the timestamp meets the requirements, detecting a facial position in the facial image data and adding an adversarial sample to the facial position for facial recognition.

Here, adding an adversarial sample at the facial position is intended to counteract the impact of embedding a negative adversarial sample during a facial image collection process. That is, during the facial image collection process, the facial collection terminal (e.g., client) needs to detect the facial position, embed a negative adversarial sample in the facial detection area, and transmit the processed facial image, facial position, and timestamp in an encrypted form to a facial recognition authentication server. Thus, even in the event of camera hijacking, images not embedded with a negative adversarial sample at the time of collection will also be embedded with an adversarial sample before an authentication service performs facial recognition, thereby failing to yield correct results in the process of facial recognition.

In one embodiment, adversarial samples are pre-generated through back-propagation training of a generator based on the results of facial recognition. For instance, adversarial samples can be generated through the following steps: (1) Constructing an adversarial generative network, where a generative model is responsible for creating a fake facial image while a discriminator serves as a facial recognition model, with the parameters of the facial recognition model fixed and only the parameters of a generator optimized; (2) generating noise information with the generator, and adding the noise information to real facial image data to form fake data and fake labels; (3) recognizing generated facial data with a facial recognition model; (4) performing a back-propagation training on the generator based on recognition results; (5) repeating Steps (2) to (4) until the facial recognition model produces an erroneous recognition result. At this point, the image produced by the generator is adversarial sample A, and its additive inverse, −A, is the negative adversarial sample. It is understood that an adversarial sample belongs to additive noise while a negative adversarial sample is the negative value of the adversarial sample, intended to counteract the effect of the adversarial sample.

In one embodiment, a negative adversarial sample needs to be generated only once, with subsequent embedding and removal processes in images being straightforward and efficient. Moreover, facial data embedded with a negative adversarial sample do not affect human vision, meaning that even if the data are cracked during transmission, the data cannot be removed.

Figure 3:
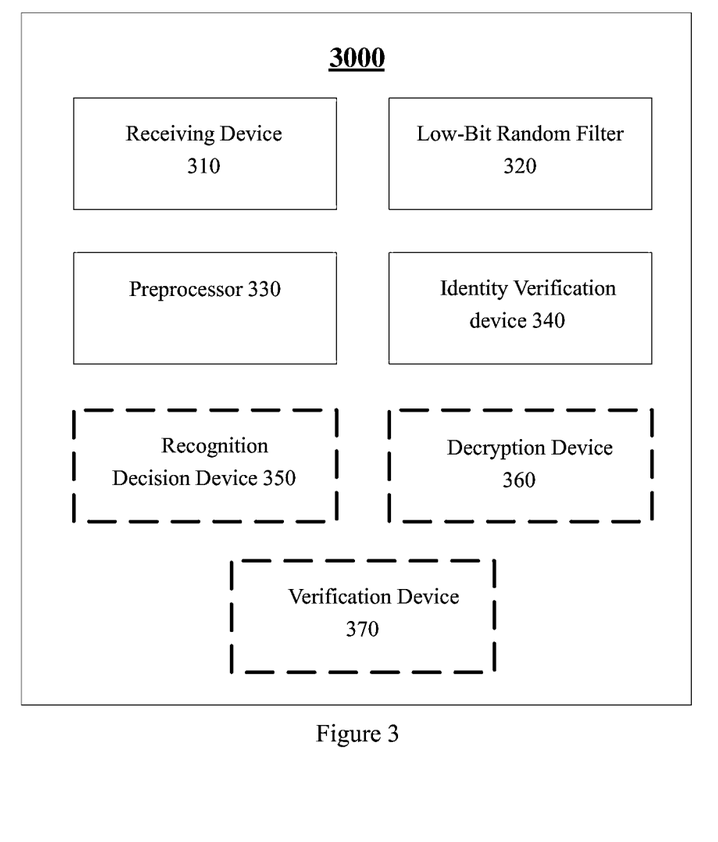
FIG. 3 shows a schematic structure of a biometric recognition server according to an embodiment of the disclosure.

Turning to FIG. 3, it illustrates a schematic structure of the biometric recognition server 3000 according to an embodiment of the disclosure. As shown in FIG. 3, the biometric recognition server 3000 comprises: a receiving device 310, a low-bit random filter 320, a preprocessor 330, and an identity verification device 340, wherein, specifically, the receiving device 310 is devised to receive biometric data, the low-bit random filter 320 is used to randomly transform low-bit data in received biometric data, the preprocessor 330 is configured to randomly select one or more filtering algorithms to pre-process randomly transformed biometric data, and the identity verification device 340 is intended to perform identity verification based on pre-processed biometric data.

In the context of the disclosure, the term "biometric data" refers to any inherent data of a human body that can be used for personal identification, as well as auxiliary information related to the noted data. For example, biometric data includes, but is not limited to, physiological characteristics (such as fingerprints, irises, facial features and DNA) and behavioral characteristics (such as gait and typing habits).

In one embodiment, the biometric data includes facial image data. In another embodiment, in addition to facial image data, the biometric data also includes a timestamp associated with the facial image data. The timestamp could be either the time when the facial image data was recorded or the time when the facial image data was uploaded.

An "adversarial sample" refers to a sample that can mislead classifiers into making incorrect predictions affecting human visual without recognition, e.g., adversarial samples could be anormal samples created by attackers through slight perturbations of normal samples. In one embodiment, the adversarial sample can cause a CNN model to yield a highly confident incorrect output. FIG. 2 shows an adversarial sample in a facial comparison algorithm. After superimposing adversarial noise, the facial comparison score dramatically drops from 100 to below 60. That is, the facial comparison algorithm can no longer successfully recognize these two individuals in this case. Adversarial sample attacks are categorized into white-box attacks and black-box attacks. A white-box attack refers to the scenario where an attacker knows all information about the recognition model, including training data, model architecture, hyper-parameters, the number of layers, activation functions and model weights, and generates adversarial samples for attack through calculation of model gradients, while a black-box attack refers to attacks conducted without knowledge of the aforementioned information.

From the principle of adversarial sample attacks, it is understood that the fundamental cause of misrecognition in a biometric recognition system (e.g., a facial recognition system) is the addition of additive adversarial noise to the biometric data (e.g., facial image data) by attackers.

The inventor of the present application discovers that most of the data values of adversarial noise or adversarial samples are extremely low, for example, only the low bits of 8-bit image data are changed. Thus, performing random transformations on the low-bit data of the biometric data can disrupt most data of adversarial noise. Here, "low-bit data" refers to the lowest bits, the last two bits, or the last three bits of data inherent to the human body that can be used for personal identification.

In one embodiment, the low-bit random filter 320 is configured to randomly transform lowest bits in the biometric data. Certainly, those skilled in the art can understand that, in one embodiment, the random filter device 320 can perform a random transformation on the last two bits or the last three bits of the biometric data, not limited to the lowest bits.

In one embodiment, the low-bit random filter 320 is configured to perform any one of the following: setting the lowest bits of the biometric data all to 0; setting the lowest bits of the biometric data all to 1; randomly re-arranging the lowest bits of the biometric data; and randomly generating the lowest bits of the biometric data. For example, for 8-bit image data, the random transformation of the lowest bits can include the following four algorithms: (1) setting the 8-bit lowest bits all to 0; (2) setting the 8-bit lowest bits all to 1; (3) randomly re-arranging the 8-bit lowest bits; and (4) randomly generating the 8-bit lowest bits. In one or more embodiments, the algorithm employed by the low-bit random filter 320 is not fixed but is randomly selected from multiple algorithms (such as the said four algorithms) to pre-process an input image.

After the low-bit random filter 320 performs a random transformation on the lowest bits of the biometric data, it is advantageous that the preprocessor 330 filters (pre-process) randomly transformed biometric data again, thereby smoothing the biometric data (e.g., smoothing facial image data). For instance, the preprocessor 330 is configured to pre-process the randomly transformed biometric data by randomly selecting one or more filtering algorithms.

Taking image data (e.g., facial image data) as an example, there are various image denoising/filtering algorithms, including, including but not limited to, BM3D denoising; DCT denoising; PCA denoising; K-SVD denoising; non-local means denoising; WNNM denoising; image denoising algorithms based on principal component analysis and bilateral filtering; wavelet transformation; wavelet threshold denoising; Contourlet transform; SAR image denoising based on shift-invariant Contourlet transform, etc. In one or more embodiments, the preprocessor is configured to randomly select one or several of these 11 filtering algorithms to pre-process the input image. Normally, noise removal does not affect the recognition results of a facial recognition system but significantly disrupts the adversarial noise in the image, rendering the adversarial attack ineffective. In one or more embodiments, one or several of these 11 filtering algorithms are randomly selected to pre-process an input image. Normally, removing noise does not affect the recognition results of a facial recognition system, which instead significantly disrupts the adversarial noise in the image, rendering the adversarial attack ineffective.

In one embodiment, the server 3000 may also comprise: a recognition decision device 350 to compare multiple recognition results for consistency and to feed back the results when all the recognition results are consistent. For example, the first recognition is an identity verification carried out directed at the original biometric data (i.e., without undergoing the random transformation of lower bits), while the first and the second recognitions are both of identity verifications performed on biometric data undergone random transformation of lower bits (where different filtering algorithms may be employed). On condition that the results of these three identity verifications are consistent, the identity verification result can be directly fed back.

In one embodiment, the recognition decision device 350 is further configured to: feed back a recognition process anomaly when the recognition results are inconsistent; add the corresponding data collection terminal to a blacklist. This means, when the results of multiple identity verifications (e.g., three times) differ, a recognition process anomaly (likely due to an adversarial sample attack) may be fed back, with the terminal where the anomalous data are collected being added to a blacklist. Subsequently, identity verification services would be denied to the terminal. Thus, through the addition of a multi-image verification strategy and a blacklist rejection strategy, it is capable of effectively preventing attackers from conducting black-box mode attack training.

At present, the most significant issue affecting facial recognition is camera hijacking attacks, which severely damage the security of facial recognition systems. The primary principle of such attacks is as follows: firstly, an attacker "cracks" a payment app to hijack camera data; next, the attacker completes the live detection process required for facial recognition; finally, the attacker replaces video data uploaded by a camera with pre-fabricated victim video data and uploads falsified data to a backend facial recognition system, thereby completing the entire attack process. Currently, the vast majority of facial recognition systems lack the capability to defend against such camera hijacking attacks.

To address this issue, in one embodiment, the server 3000 may also comprise: a decryption device 360 to decrypt the biometric data to obtain the facial image data and the timestamp; and a verification device 370 to feed back an anomaly when a difference between system time and the timestamp does not meet requirements. In one embodiment, the verification device 370 is further configured, when the difference between the system time and the timestamp meets the requirements, to detect a facial position in the facial image data and to add an adversarial sample at the facial position for facial recognition.

The verification device 370 adds an adversarial sample at the facial position to counteract the effect of a negative adversarial sample embedded during the facial image collection process. That is, during the facial image collection process, the facial collection terminal (e.g., client) needs to detect the facial position, embed a negative adversarial sample in the facial detection area, and transmit the processed facial image, facial position, and timestamp in an encrypted form to a facial recognition authentication server. Thus, even in the event of camera hijacking, images not embedded with a negative adversarial sample at the time of collection will also be embedded with an adversarial sample before an authentication service performs facial recognition, thereby failing to yield correct results in the process of facial recognition.

In one embodiment, adversarial samples are pre-generated by performing back-propagation training on a generator based on the results of facial recognition. For instance, adversarial samples can be generated by a biometric recognition server, with the specific generation method comprising: Step A: constructing an adversarial generative network comprising a generator and a discriminator; Step B: generating noise information with the generator, and adding the noise information to real facial image data to obtain generated facial data; Step C: recognizing the generated facial data with a facial recognition model; Step D: performing a back-propagation training on the generator based on recognition results; Step E: repeating the Steps B to D until the facial recognition model produces an erroneous recognition result; and Step F: determining the noise information corresponding to the erroneous recognition result as an adversarial sample A. The additive inverse, −A, is the negative adversarial sample. It is understood that an adversarial sample belongs to additive noise while a negative adversarial sample is the negative value of the adversarial sample, intended to counteract the effect of the adversarial sample.

In one embodiment, a negative adversarial sample needs to be generated only once, with subsequent embedding and removal processes in images being straightforward and efficient. Moreover, facial data embedded with a negative adversarial sample do not affect human vision, meaning that even if the data are cracked during transmission, the data cannot be removed.

Figure 4:
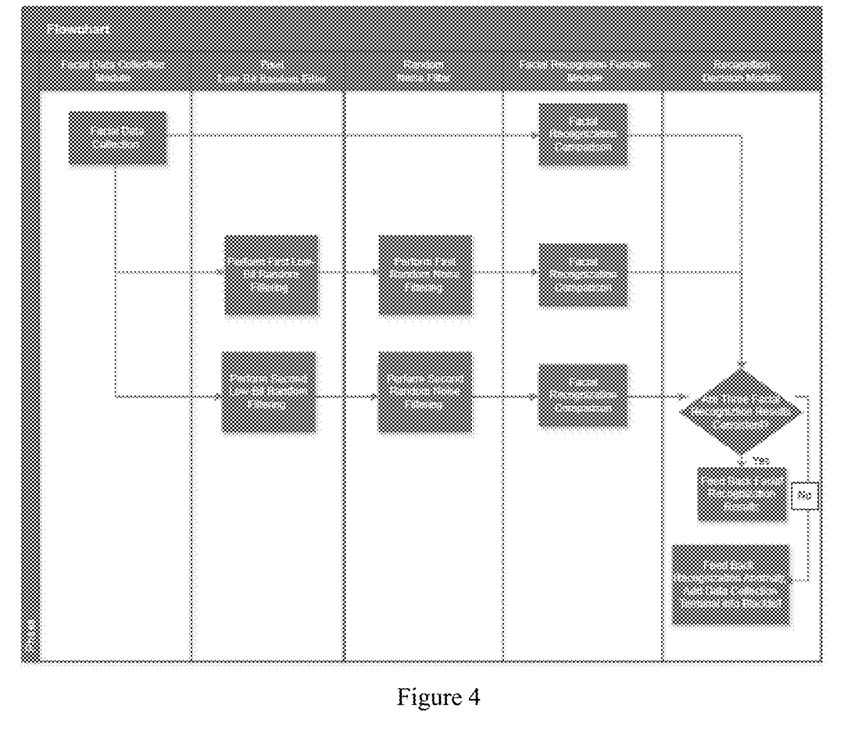
FIG. 4 depicts a flowchart of facial recognition according to an embodiment of the disclosure.

FIG. 4 depicts a flowchart of facial recognition according to an embodiment of the disclosure. As shown in FIG. 4, the facial recognition system may include multiple devices or modules, such as the facial data collection module, the pixel low-bit random filter, the random noise filter, the facial recognition function module, and recognition decision module, as depicted in FIG. 4. In one embodiment, the facial data collection module may be located on a client side, for example, included in a user's smartphone. The pixel low-bit random filter, the random noise filter, the facial recognition function module and the recognition decision module may be located on a server side, for example, within a facial authentication service platform.

The facial data collection module is responsible for collecting facial data. Given that the majority of adversarial noise data values are extremely low, affecting only the lowest bits of 8-bit image data, the pixel low-bit random filter transforms the lowest bits of the image data randomly, thus disrupting the majority of the adversarial noise data. The filtering algorithms contained in the pixel low-bit random filter primarily consist of: setting the 8-bit lowest bits all to 0; setting the 8-bit lowest bits all to 1; randomly re-arranging the 8-bit lowest bits; and randomly generating the 8-bit lowest bits. During the filtering process, the pixel low-bit random filter can randomly select from the above 4 algorithms to pre-process the input image.

The random noise filter's denoising algorithms include, but are not limited to, the following methods: BM3D denoising; DCT denoising; PCA denoising; K-SVD denoising; NL-Means non-local denoising; WNNM denoising; image denoising algorithms based on principal component analysis and bilateral filtering; wavelet transformation; wavelet threshold denoising; Contourlet transform; and SAR image denoising based on shift-invariant Contourlet transform. The random noise filter can randomly select one or several from the above 11 filtering algorithms to preprocess the input image.

The facial recognition function module is responsible for completing the process of facial recognition in images. The recognition decision module compares the results of multiple facial comparisons for consistency, wherein, on condition that the results are consistent, the results are fed back; on condition that the results are inconsistent, a recognition process anomaly is fed back and a corresponding data collection terminal is added to a blacklist.

In one embodiment, after the facial data collection module completes data collection, the facial recognition function module performs a first facial recognition on the original facial data, feeding back the recognition results to the recognition decision module. next, the original facial data undergoes first pixel low-bit random filtering and first random noise filtering, followed by a second facial comparison on the filtered data. Subsequently, the original facial data undergoes second pixel low-bit random filtering and second random noise filtering (ensuring that the method of the second filtering is different from that of the first filtering), followed by a third facial comparison on the filtered data. Finally, the recognition decision module compares the results of the three filtrations: on condition that the three recognition results are consistent, the recognition decision module feeds back a normal value for facial recognition; on condition that the three recognition results are inconsistent, the recognition decision module feeds back that there is a recognition anomaly (the anomaly value is S) and adds the terminal that collects the anomalous data to a blacklist. Subsequently, identity verification services would be denied to the terminal.

Figure 5:
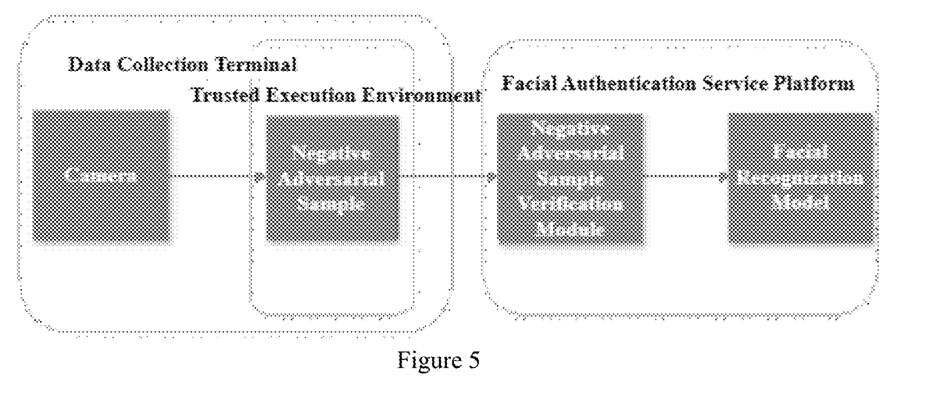
FIG. 5 displays a schematic diagram of a facial recognition system including a data collection terminal and a facial authentication service platform according to an embodiment of the disclosure.

FIG. 5 displays a schematic diagram of a facial recognition system including a data collection terminal and a facial authentication service platform according to an embodiment of the disclosure. The data collection terminal can be located on the user side, while the facial authentication service platform be on the remote server side.

In the embodiment shown in FIG. 5, the data collection terminal provides operational resources for a camera and a Trusted Execution Environment (TEE), where the camera is responsible for collecting facial data and the TEE for providing a secure operation and storage environment for the applications and drivers of the data collection terminal. As shown in FIG. 5, the data collection terminal also includes a negative adversarial sample embedding module, the embedding module devised to detect a facial position, embed a negative adversarial sample in a facial detection area and to transmit a processed facial image, facial position and timestamp in an encrypted form to the facial authentication service platform located remotely.

In an embodiment, the facial authentication service platform is devised to fulfill facial recognition authentication services, a negative adversarial sample verification module devised to decrypt the facial image, facial position and timestamp, while a facial recognition model is intended to recognize a verified facial recognition image, feeding back the identity information of an identified individual.

Figure 6:
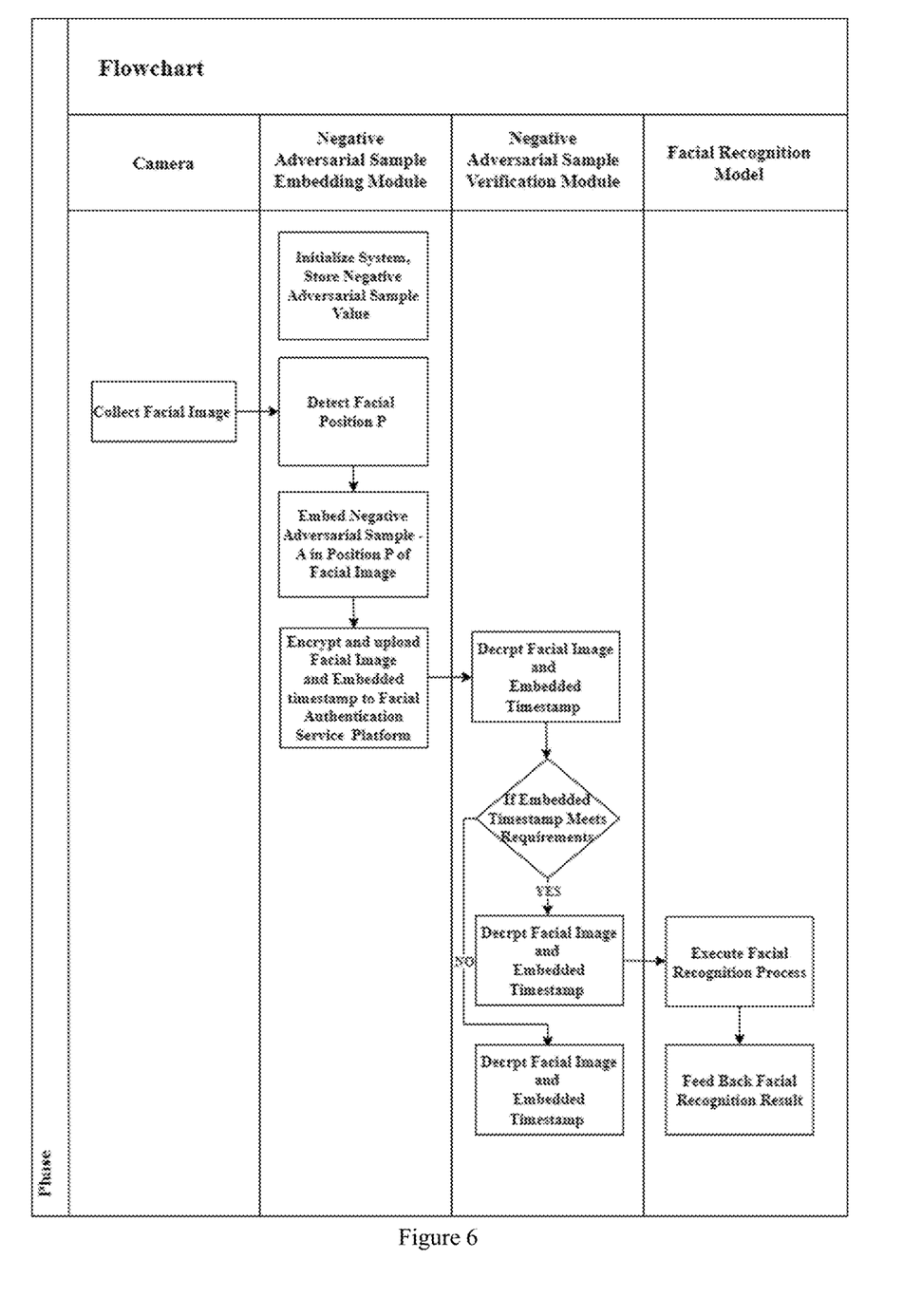
FIG. 6 demonstrates a flowchart of facial recognition according to another embodiment of the disclosure.

FIG. 6 demonstrates a flowchart of facial recognition using the facial recognition system shown in FIG. 5. As illustrated in FIG. 6, before facial recognition is conducted, the data collection terminal carries out application initialization, storing a facial detection model and a negative adversarial sample-A in a Trusted Execution Environment. Next, the camera captures a facial image; the negative adversarial sample embedding module detects a facial position P in the facial image, and after embedding the negative adversarial sample-A in P area, encrypts and uploads the facial image along with an embedded timestamp t to the facial authentication service platform. Following this, the server-side negative adversarial sample verification module decrypts the facial data and the embedded timestamp t, verifies the embedded timestamp t. On condition that the difference between the system time and the t does not meet the requirements, an anomaly is fed back to the platform; otherwise, the facial position P is detected with the adversarial sample A embedded in the position P. Finally, the facial recognition model executes the facial recognition process and feeds back the recognition result.

In one embodiment, the process of embedding a negative adversarial sample may include the following steps: detecting a facial position P (x1, y1, x2, y2) in an input image F, wherein x and y represent the horizontal and vertical coordinates of a facial frame, respectively, and pixel block content determined by the position P in the image is denoted as S; setting S1=(S−A) mod 256, and replacing the value S with S1, at which point the image transforms into F1; recording negative sample embedding time t; and encrypting (F1, t).

In one embodiment, the process of verifying a negative adversarial sample may include the following steps: decrypting (F1, t); verifying that the difference between system time t1 and a timestamp t is within a range (−a, a); detecting a facial position P (x1, y1, x2, y2) in an input image F, wherein the pixel block content determined by the position P in the image denoted as S1; setting S=(S1+A) mod 256; replacing the value S1 with S, at which point the image reverts to F.

It should be noted that although, in FIG. 6, the negative adversarial sample embedding module and the negative adversarial sample verification module are shown as single modules, those skilled in the art can understand that these modules can be further subdivided according to function or need, for example, the negative adversarial sample verification module can be further divided into a decryption module and a verification module.

Furthermore, the device embodiments described above are merely illustrative, where the modules described as separate components may not be physically separate, that is, they may be located in one place or be distributed across multiple network modules. Part or all of the modules can be selected according to practical requirements to achieve the purpose of this embodiment, which those skilled in the art can understand and implement without investment of creative work.

Through the description of various embodiments referenced above, those skilled in the art can clearly learn that all the embodiments can be implemented either through software in conjunction with the necessary general hardware platform, or, of course, by hardware. Based on such understanding, the essential or contributory part of the above technical solutions to the prior art can be embodied in the form of a software product, which can be stored on a computer-readable storage medium. The computer-readable storage medium comprises any mechanism for storing or transmitting information in a form readable by a computer (e.g., a computer), such as read-only memory (ROM), random access memory (RAM), disk storage media, optical storage media, flash storage media, electrical, optical, acoustic, or other forms of propagation signals (e.g., carrier waves, infrared signals, digital signals, etc.). The computer software product comprises several instructions to enable a computing device (which can be a personal computer, server, or network device, etc.) to execute the method described in various embodiments or some parts thereof.

The present application is described with reference to the flowcharts and/or block diagrams of the methods, apparatuses (devices), and computer program products according to the embodiments of the present application. It should be understood that each process and/or block within the flowcharts and/or block diagrams, as well as combinations of the processes and/or blocks in the flowcharts and/or block diagrams, can be implemented by computer program instructions. These computer program instructions may be provided to a processor of a general-purpose computer, a special purpose computer, an embedded processor, or other programmable data processing apparatuses to create a machine, such that the instructions executed via the processor of the computer or other programmable data processing apparatuses establish means for implementing the functions specified in one or more processes within the flowcharts and/or one or more blocks within the block diagrams.

Moreover, these computer program instructions may also be stored in a computer-readable memory that can direct a computer or other programmable data processing apparatuses to function in a particular manner, such that the instructions stored in the computer-readable memory create a manufactured product including an instruction means, the instruction means implementing the functions specified in one or more processes within the flowcharts and/or one or more blocks within the block diagrams.

These computer program instructions can also be loaded onto a computer or other programmable data processing apparatuses, enabling a series of operational steps to be executed on the computer or other programmable device to produce computer-implemented processing. As such, the instructions executed on the computer or other programmable apparatuses provide steps for implementing the functions specified in one or more processes of the flowchart and/or one or more blocks of the block diagram.

In summary, according to one or more embodiments of the disclosure, the biometric recognition solution is intended to perform identity verification through random transformation of low-bit data in received biometric data and based on pre-processed biometric data. The solution significantly disrupts the adversarial noise in images, rendering the adversarial attack ineffective. As such, even if attackers were to obtain the parameters of a biometric recognition model, the training process of an adversarial attack model would fail to achieve stable convergence, thereby failing to develop an effective attack model.

Additionally, in one or more embodiments, by incorporating a multiple image verification strategy and blacklist denial strategy, is it capable of effectively preventing attackers from conducting black-box mode attack training. Moreover, the process of embedding a negative adversarial sample is added during a facial image collection process and the process of verifying (removing) a negative adversarial sample is added at a facial recognition system end. Due to such design, images not embedded with a negative adversarial sample at the time of collection will also be embedded with an adversarial sample before an authentication service performs facial recognition, thereby failing to yield correct results in the process of facial recognition. A negative adversarial sample needs to be generated only once, with subsequent embedding and removal processes in an image being computationally simple and efficient. Moreover, facial data embedded with a negative adversarial sample do not affect human vision, meaning that even if the data are cracked during transmission, the data cannot be removed.

Although preferred embodiments are already described, those skilled in the art, upon acquiring the primary creative concepts, could make additional changes and modifications to such embodiments. For this reason, the appended claims are intended to be explained as those encompassing the preferred embodiments and all the changes and modifications falling within the scope of the present application. Evidently, those skilled in the art are allowed to make various changes and modifications to the present application without departing from its spirit and scope of the application. Consequently, when these modifications and variations of the present application fall within the scopes of the claims of the present application and their technological equivalents, the present application also intends to include such modifications and variations.

What is claimed is:

1. A biometric recognition method, comprising:
Step A: receiving biometric data;
Step B: performing a random transformation of low-bit data in the received biometric data;
Step C: randomly selecting one or more filtering algorithms to pre-process the randomly transformed biometric data; and
Step D: performing identity verification based on the pre-processed biometric data; wherein the biometric data includes facial image data and a timestamp and the method further comprises between the Steps A and B:
decrypting the biometric data to obtain the facial image data and the timestamp;
feeding back an anomaly when a difference between system time and the timestamp does not meet requirements;
detecting a facial position in the facial image data when the difference between the system time and the timestamp meets the requirements; and,
adding an adversarial sample to the facial position, the adversarial sample devised to counteract action of a negative adversarial sample added at the data collection terminal, wherein the negative adversarial sample is a negative value of the adversarial sample.

2. The method according to claim 1, wherein the step of "performing a random transformation of low-bit data in received biometric data" comprises: performing a random transformation of lowest bits in the biometric data.

3. The method according to claim 2, wherein the step of "performing a random transformation of lowest bits in the biometric data" comprises any one of the following:
setting the lowest bits of the biometric data all to 0;
setting the lowest bits of the biometric data all to 1;
randomly re-arranging the lowest bits of the biometric data; and
randomly generating the lowest bits of the biometric data.

4. The method according to claim 1, wherein the identity verification based on the pre-processed biometric data is performed in the Step D to obtain a first comparison result, and the method further comprises:
repeating execution of the Steps B to D to obtain a second comparison result; and
directly performing identity verification based on received biometric data to obtain a third comparison result.

5. The method according to claim 4, further comprising:
comparing the first comparison result, the second comparison result and the third comparison result for consistency; and
feeding back the first comparison result when the first comparison result, the second comparison result and the third comparison result are consistent.

6. The method according to claim 5, further comprising:
feeding back a recognition process anomaly when the first comparison result, the second comparison result and the third comparison result are inconsistent; and
adding a corresponding data collection terminal to a blacklist.

7. The method according to claim 1, wherein the adversarial sample is pre-generated by performing a backpropagation training on a generator based on facial recognition results.

8. A biometric recognition server, comprising:
a receiving device to receive biometric data, wherein the biometric data comprises facial image data and a time stamp;
a low-bit random filter to randomly transform low-bit data in the received biometric data;
a preprocessor to randomly select one or more filtering algorithms to pre-process randomly transformed biometric data;
an identity verification device to perform identity verification based on the pre-processed randomly transformed biometric data;
a decryption device to decrypt the biometric data to obtain the facial image data and the timestamp; and
a verification device to feed back an anomaly when a difference between system time and the timestamp does not meet requirements, wherein the verification device is further configured to detect a facial position in the facial image data when the difference between the system time and the timestamp meets the requirements, and to add in the facial position an adversarial sample for counteracting action of a negative adversarial sample added at the data collection terminal, wherein the negative adversarial sample is a negative value of the adversarial sample.

9. The server according to claim 8, wherein the low-bit random filter is configured to randomly transform lowest bits in the biometric data.

10. The server of claim 8, wherein the adversarial sample is pre-generated by performing a backpropagation training on a generator based on facial recognition results.

11. A client for use in conjunction with the server according to claim 10, comprising: a facial data collection device to collect the facial image data; and
an embedding device to embed the negative adversarial sample in the facial position.

* * * * *